12) United States Patent
Granshaw et al.

(10) Patent No.: US 9,910,710 B2
(45) Date of Patent: Mar. 6, 2018

(54) PRIORITISING EVENT PROCESSING BASED ON SYSTEM WORKLOAD

(71) Applicant: International Business Machines Corporation, Armonk, NY (US)

(72) Inventors: David Granshaw, Hursley Park (GB); Samuel T. Massey, Hursley Park (GB); Daniel J. McGinnes, Hursley Park (GB); Martin A. Ross, Hursley Park (GB); Richard G. Schofield, Hursley Park (GB); Craig H. Stirling, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 15/183,955

(22) Filed: Jun. 16, 2016

(65) Prior Publication Data

US 2016/0299788 A1 Oct. 13, 2016

Related U.S. Application Data

(63) Continuation of application No. 14/296,723, filed on Jun. 5, 2014, now Pat. No. 9,424,546.

(30) Foreign Application Priority Data

Jun. 11, 2013 (GB) .................................. 1310378.3

(51) Int. Cl.
G06F 3/00 (2006.01)
G06F 9/44 (2006.01)
G06F 9/46 (2006.01)
G06F 13/00 (2006.01)
G06F 9/50 (2006.01)
G06Q 10/06 (2012.01)

(52) U.S. Cl.
CPC ..... *G06F 9/5038* (2013.01); *G06Q 10/06312* (2013.01); *G06F 2209/5012* (2013.01)

(58) Field of Classification Search
CPC ...................................................... G06F 9/5038
USPC ........................................................ 719/313
See application file for complete search history.

(56) References Cited

U.S. PATENT DOCUMENTS

2007/0260470 A1 11/2007 Bornhoevd et al.
2009/0006320 A1 1/2009 Ding et al.
(Continued)

FOREIGN PATENT DOCUMENTS

EP 2487868 A1 8/2012

OTHER PUBLICATIONS

Search Report under Section 17 from the United Kingdom Intellectual Property Office, dated Nov. 18, 2013, 1 page.

(Continued)

*Primary Examiner* — Timothy A Mudrick
(74) *Attorney, Agent, or Firm* — Yee & Associates, P.C.; Nicholas D. Bowman

(57) ABSTRACT

Event processing is prioritized based on system workload. A time constraint attribute is defined in an event rule. The event rule uses one or more events. An event processing system is monitored to determine when the system is under a predefined level of stress. If the system is determined to be under the predefined level of stress, the time constraint attribute in the event rule is used to establish when the processing of a received event used in an event rule must be carried out.

20 Claims, 3 Drawing Sheets

(56) References Cited

U.S. PATENT DOCUMENTS

| | | | |
|---|---|---|---|
| 2009/0070786 A1 | 3/2009 | Alves et al. | |
| 2011/0093866 A1 | 4/2011 | Grabs et al. | |
| 2011/0196774 A1* | 8/2011 | Scianna | G06Q 40/04 705/37 |
| 2012/0084317 A1* | 4/2012 | Sakamoto | G06Q 40/04 707/769 |
| 2012/0110599 A1* | 5/2012 | Schoning | G06F 9/542 719/318 |
| 2012/0124082 A1 | 5/2012 | Crocker et al. | |
| 2012/0278293 A1 | 11/2012 | Bulkowski et al. | |
| 2014/0366032 A1 | 12/2014 | Granshaw et al. | |

OTHER PUBLICATIONS

Fodor et al., "Results on Out-of-Order Event Processing," Practical Aspects of Declarative Languages, Lecture Notes in Computer Science vol. 6539, Jan. 2011, pp. 220-234.

Magid et al., "Application Generation Framework for Real-Time Complex Event Processing," Proceedings of the 32nd Annual IEEE International Computer Software and Applications Conference (COMPSAC'08), Jul. 2008, pp. 1162-1167.

Office Action, dated May 13, 2015, regarding U.S. Appl. No. 14/296,723, 16 pages.

Final Office Action, dated Nov. 12, 2015, regarding U.S. Appl. No. 14/296,723, 18 pages.

Office Action, dated Feb. 11, 2016, regarding U.S. Appl. No. 14/296,723, 15 pages.

Notice of Allowance, dated May 20, 2016, regarding U.S. Appl. No. 14/296,723, 7 pages.

* cited by examiner

PRIORITISING EVENT PROCESSING BASED ON SYSTEM WORKLOAD

This application is a continuation of and claims the benefit of priority to U.S. patent application Ser. No. 14/296,723, filed Jun. 5, 2014, which claims the benefit of priority to United Kingdom Patent Application Serial No. GB1310378.3, filed on Jun. 11, 2013, the contents of which are hereby incorporated by reference.

BACKGROUND

This invention relates to the field of event processing. In particular, the invention relates to prioritizing event processing based on system workload.

In a complex event processing system, there can be a wide variety of events and rules to act upon those events deployed in a central processing system. These types of system can also experience heavy loads of tens of thousands of events per second. The number of events being sent to the system may also vary significantly over time, where at certain periods of the day there could be thousands of events per second arriving, whereas at other times there could be several hours where no events are received. In order to handle such workloads there are two traditional approaches.

The first approach is to size the system so that it is able to process at the expected peak rate. This can add considerable expense to the solution, as software is typically charged per number of processors. For example, if 12 cores are required to handle a peak load that lasts for one hour per day, and only one core is needed to handle the load for the other 3 hours, the client would be paying for all 12 cores.

The second approach is to size for a lower rate, and allow messages to build up on input queue. If the system does not have sufficient processing power to handle the input rate, then events will typically build up on the input queue assuming an asynchronous messaging event processing system.

Events building up on the input queue can have several drawbacks:

1) If a large number of messages build up on the input queue then it can slow down the processing of events that may be time sensitive, for example, certain types of event may need to be processed within seconds of arriving. Message priorities could be used to mitigate this problem, which should allow higher priority events to be processed first, but this relies on the message producer to set the priority, whereas it would typically be the business user that is defining the event processing logic that would understand which events are higher priority, and as new logic is added priorities could change, which would be difficult to distribute to all message producers.

2) Handling a large number of messages on a queue can add significant load to the messaging system, particularly if messages have different priorities, so this could slow the system down even more when it is under load.

Therefore, there is a need in the art to address the aforementioned problems.

SUMMARY

According to a first aspect of the present invention there is provided a method for prioritizing event processing based on system workload, comprising: defining a time constraint attribute in an event rule, wherein the event rule uses one or more events; monitoring an event processing system to determine when the system is under a predefined level of stress; and if the system is determined to be under the predefined level of stress, establishing when the processing of a received event used in an event rule must be carried out using the time constraint attribute in the event rule.

Establishing when the processing of a received event used in an event rule must be carried out may include processing the event immediately if the time constraint attribute indicates immediate action; or processing the event after a predetermined amount of time as defined by the time constraint attribute.

Establishing when the processing of a received event used in an event rule must be carried out may include calculating the maximum delay for an event based on the time constraints of one or more event rules in which the event is used; and storing the event with a timer task for processing the event after the maximum delay.

Processing a stored event after the maximum delay may have priority over newly received events.

The method may include determining that the system is no longer under the predefined level of stress; and processing any stored events in the order of their stored time delay.

The method may include setting a flag if the system is determined to be under a predefined level of stress; and checking the flag when receiving an event at the event processing system.

Defining a time constraint attribute in an event rule may be defined in an option in a business user interface of an event processing system.

Monitoring an event processing system may monitor components of the system and determine if predefined stress parameters for the components are met.

According to a second aspect of the present invention there is provided a system for prioritizing event processing based on system workload, comprising: a rule generating interface including a time constraint setting component for defining a time constraint attribute in an event rule, wherein the event rule uses one or more events; a stress determining component for monitoring an event processing system to determine when the system is under a predefined level of stress; and a runtime component including a stress processing component for, if the system is determined to be under the predefined level of stress, establishing when the processing of a received event used in an event rule must be carried out using the time constraint attribute in the event rule.

The stress processing component for establishing when the processing of a received event used in an event rule must be carried out may include an urgent event component for processing the event immediately if the time constraint attribute indicates immediate action; or an event delay calculating component for processing the event after a predetermined amount of time as defined by the time constraint attribute.

The stress-processing component may include an event rule-checking component for calculating the maximum delay for an event based on the time constraints of one or more event rules in which the event is used; and an event-storing component for storing the event with a timer task for processing the event after the maximum delay.

The system may include an event retriever component for retrieving and processing a stored event after a given time delay.

The stress-determining component may be for determining that the system is no longer under the predefined level of stress; a stored event retriever component may be for processing any stored events in the order of their stored time delay.

The system may include a flag-setting component for setting a flag if the system is determined to be under a predefined level of stress; and a flag-checking component for checking the flag when receiving an event at the event processing system.

The rule-generating interface may be a business user interface of an event processing system.

The stress-determining component for monitoring an event processing system may monitor components of the system and determine if predefined stress parameters for the components are met. The components of the system may include one or more of the group of a processor, a memory, an input queue.

According to a third aspect of the present invention there is provided a computer program product for prioritizing event processing based on system workload, the computer program product comprising: a computer readable storage medium readable by a processing circuit and storing instructions for execution by the processing circuit for performing a method according to the first aspect of the present invention.

According to a fourth aspect of the present invention, there is provided a computer program stored on a computer readable medium and loadable into the internal memory of a digital computer, comprising software code portions, when said program is run on a computer, for performing the method of the first aspect of the present invention.

According to a fifth aspect of the present invention, there is provided a method substantially as described with reference to the figures.

According to a sixth aspect of the present invention, there is provided a system substantially as described with reference to the figures.

The described aspects of the invention provide the advantage of processing events for rules with urgent time scales in times of system stress whilst deferring less urgent events resulting in less workload on the system.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
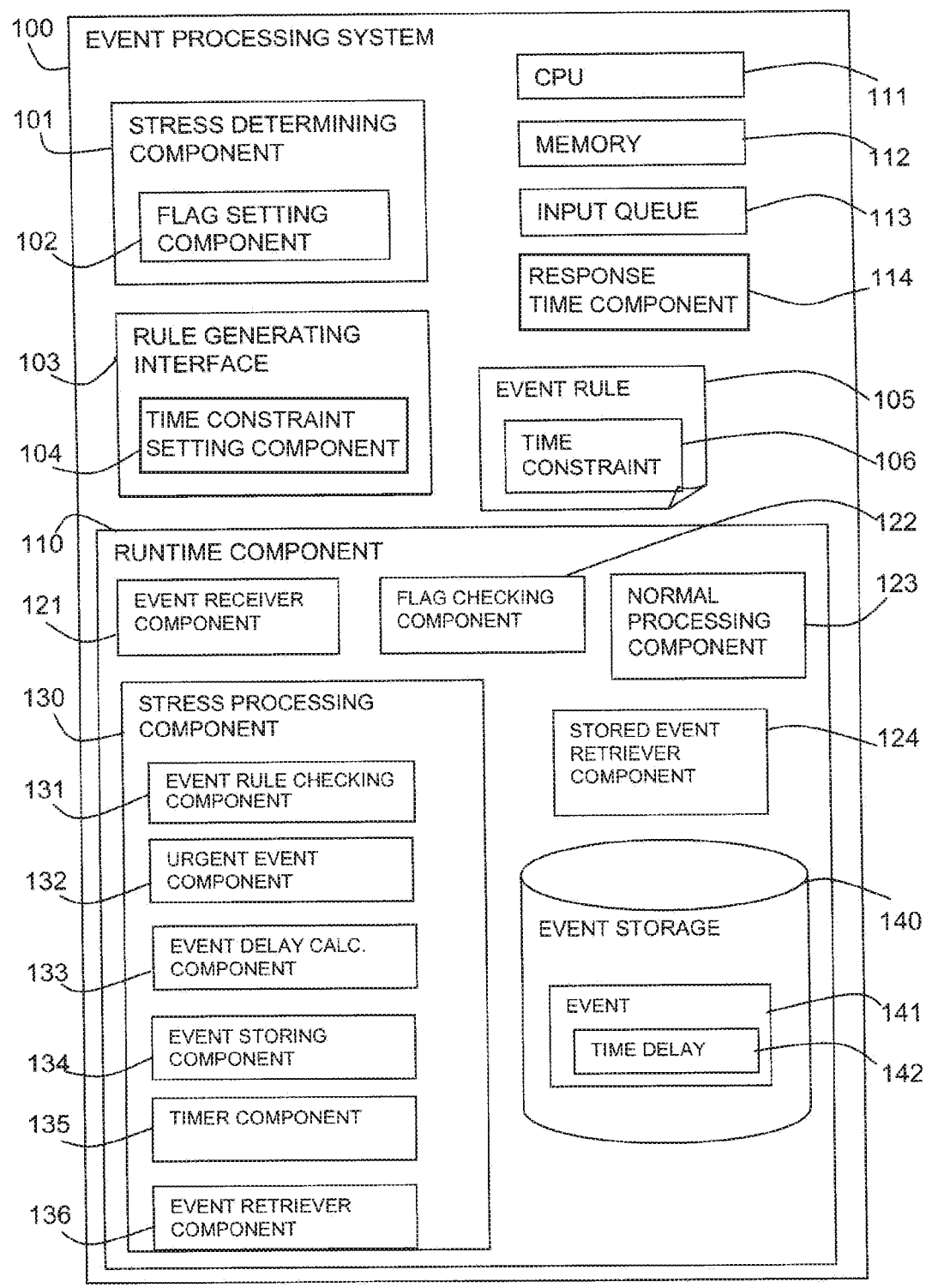
FIG. 1 is block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and a system are described for prioritizing event processing based on the system workload at a given time. In the described method, when defining event processing logic, time constraints may be placed upon the rules for when they will be processed (for example, such as "within X hours", or "same day"). The event processing system may then use system statistics and metrics to determine when the system is under stress. If this is detected, then the method may use the time constraints to determine if the processing of each event can be delayed. If an event is eligible for delay it may be stored for later processing, if it is not then it may be processed immediately.

The main purpose of an event processing system is to look for patterns in the events being processed, and generate actions if patterns are matched. Two examples of event processing used by a bank are given below.

In the first example, the event processing is for fraud detection.

```
Events:
    Purchases
    Withdrawals
Actions:
    Possible Fraud
Event Rule logic:
    IF Purchase Event amount > 1000
    AND
    Purchase Event type == 'internet'
    AND
    Purchase Event deliveryAddress != customer Address
    THEN
    Generate Possible Fraud Action
```

In the second example, the event processing is for marketing.

```
Events:
    Insurance quote on website
    Purchase Insurance Event
Actions:
    Sales agent follow up on quote
Event Rule logic:
    IF Insurance quote on website
    AND
    No Purchase Insurance Event within 1 day
    THEN
    Sales agent follow up on quote.
```

In looking at these two different applications of complex event processing, it is clear that the fraud detection logic is a much higher priority than the marketing. If a possible fraud has occurred, then an action should be generated as soon as possible, so that it can be investigated. However, the marketing action of following up on a quote, is much less important, as the actions from a previous day may just be picked up in the morning by a sales agent, and dealt with that day.

Typically, the event processing logic is defined by a business user using a business user interface. The described system may require an addition to this interface where the business user may specify time constraints on an event rule, to specify by when the logic needs to be evaluated.

In the runtime there may be provided a component that is responsible for determining if the system is under stress. This would typically look at CPU/memory utilisation, response times of event evaluation, and whether events are building up on the input queue. If "system under stress" (SUS) is detected then the component may set a flag that the runtime would query.

Referring to FIG. 1, a block diagram shows an example embodiment of the described system 100.

An event processing system 100 is described including a stress-determining component 101 for determining the stress on the event processing system 100 at a given time. The stress-determining component 101 may monitor components and operation of the event processing system 100 including a central processing unit (CPU) 111, memory 112, input queue 113, and response time measuring component 114.

The stress-determining component 101 may determine from the monitored components and operation if the event processing system 100 is under stress. Predefined parameters may be set to determine a level of stress. The stress-determining component 101 may include a flag-setting component 102 to set a flag showing that the system is under stress (SUS). The flag-setting component 102 may also remove the flag when the stress level of the event processing system 100 falls to acceptable levels, again according to predefined parameters.

The event processing system 100 may include a rule-generating interface 103 for defining event rules. The rule-generating interface 103 may include a time constraint-setting component 104 for a user to define a time constraint for a rule. For example, a time constraint may require a rule to be carried out within a set time from a relevant event being received, or may require it be carried out immediately. Event rules 105 may be stored including the defined time constraint 106. If a user does not define a time constraint for a rule, a default may be set for carrying out the rule within a predefined time period.

The event processing system 100 may include a runtime component 110. The runtime component 110 may include an event receiver component 121 for receiving events. Events may be generated by a wide range of components that may be remote to the event processing system. The runtime component 110 may process events according to defined event rules 105.

The runtime component 110 may include a flag-checking component 122 to check if a stress flag has been set by the stress-determining component 101. If no stress flag has been set, the received event may be sent for normal processing by a normal processing component 123 of the system.

However, if a stress flag has been set by the stress-determining component 101, the received event may be sent to a stress-processing component 130 that processes events according to the time constraints defined in rules that apply to the received event. The stress-processing component 130 may include an event rule-checking component 131 for checking if the received event is used in any event rules 105 that have a time constraint 106 of immediate processing. If the event rule-checking component 131 identifies a received event that requires immediate processing, an urgent event component 132 may send the received event to the normal processing component 123 for immediate processing.

For any non-urgent received events, an event delay calculation component 133 may calculate the maximum delay possible or allowed for this event based on the time constraints in the rules it relates to identified by the event rule-checking component 131. An event-storing component 134 may store the event 141 with its time delay 142 in event storage 140. A timer component 135 may be set with the time delay 142 of a stored event 141 in order to enable an event retriever component 136 to retrieve the event at the end of a time delay 142 and send the event to the normal processing component 123.

The flag-checking component 122 may continue to check the stress flag of the system 100 and, if it is identified that the flag has changed to a non-stress situation, a stored event retriever component 124 may retrieve stored events 141 from event storage 140 and may send the events to the normal processing component 123 for processing. This processing may be in the order of time of the stored events 141 time delay 142.

Figure 2:
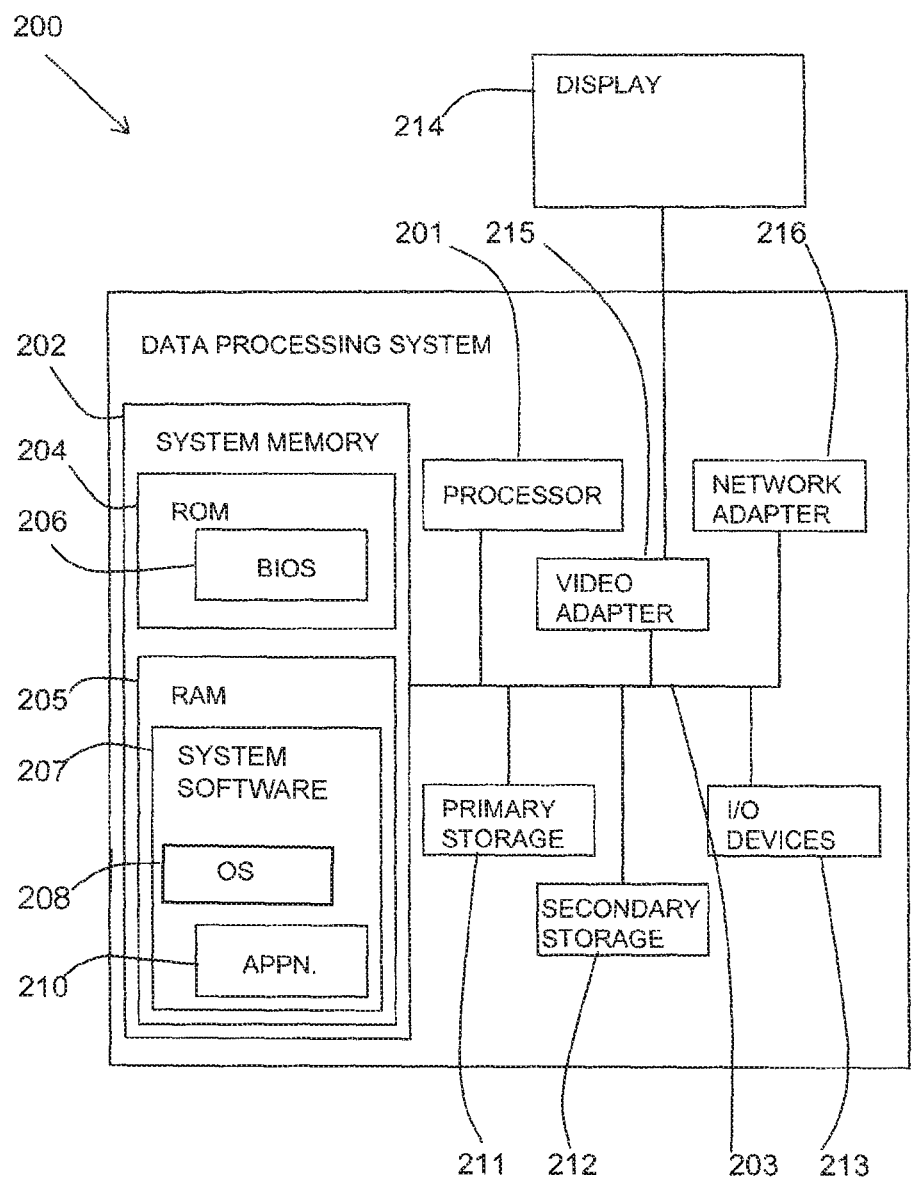
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories that provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
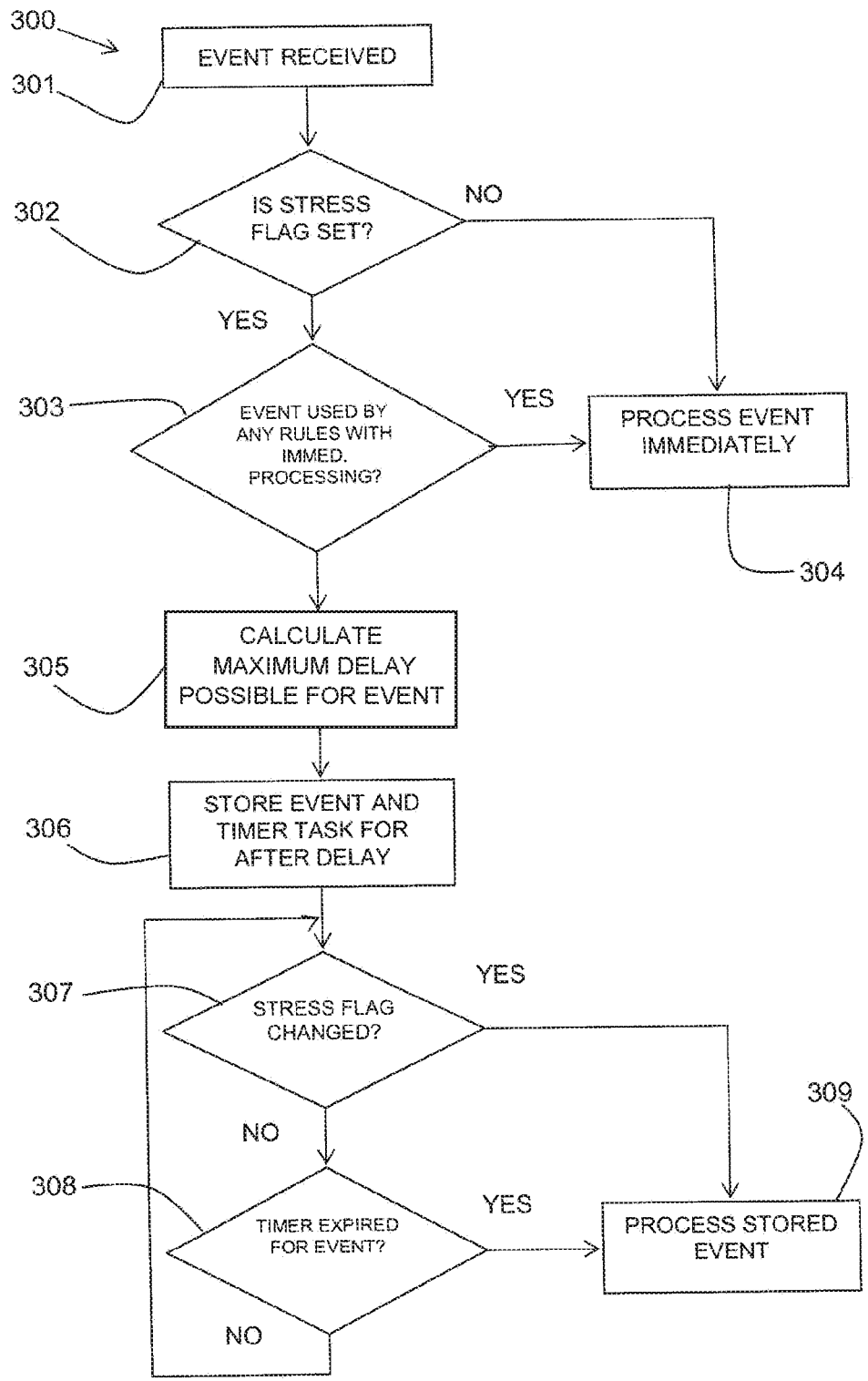
FIG. 3 is a flow diagram of an example embodiment of an aspect of a method in accordance with the present invention.

Referring to FIG. 3, a flow diagram 300 shows an embodiment of the described method at a client system.

When each event is received 301 by the event processing system, the runtime may check if a stress flag is set for the system. It may be determined 302 if the stress flag is set. If there is no stress flag set, then the event may be processed immediately 304 as in normal operations.

If it is determined that the stress flag is set, it is determined 303 if the event is used by any rules which require immediate processing as indicated by a defined time constraint in the rule. If the event is used by a rule which requires immediate processing, the event may be processed immediately 304.

If the event is not used by a rule that requires immediate processing, then the method may calculate 305 the maximum delay possible for this event. The maximum delay may be calculated in a few different ways. If the time constraint is along the lines of "must be processed within one hour", then calculating the delay is simple, it is just one hour from the current time. However, users may also wish to use time constraints such as "same day". In order to calculate the delay for this, a calculation may be made of how long there remains between the current time and midnight. Other examples of time constraints include "by 5 pm"
where the delay may be calculated in a similar way to the "same day" example.

The event and a timer task may be stored 306 that will fire at this time. The event may be stored in a persistent store such as a database, along with the time by which it should be processed.

The stress flag may be continually monitored and it may be determined 307 if the flag changes to a non-stressed state. If it is determined that the flag has changed to a non-stress state, the stored events may be processed 309 by a task that will query the database, and start processing the events that have been stored. The stored events may be processed in order of the time constraint indicating the time by which they need to be processed.

If it is determined 307 that the flag has not changed to a non-stress state and the system is therefore still in a stressed state, it may be determined 308 if the timer task has expired for a stored event. The process may read those events from the store on timer expiry, and they may be processed 309 in priority over events arriving newly in the system.

Traditional workload balancing systems work by prioritizing work, and processing it in priority order, this can lead to an overall slowdown in processing, as there is a cost to managing these priorities, and response time will suffer as the system will be running at capacity whilst all requests are serviced.

The described method attaches a "must process by" attribute to an event (i.e., a request). This attribute may be used if the system is detected as being "under stress" and requests will not be processed until this time, or a time when the system is not under stress, thereby allowing more crucial events to be processed in a more timely manner.

In the described method, a business user may define the time by which an event should be processed, and this will then be automatically honored by the runtime. Normally changes to the priorities of requests would require some intervention by developers or system administrators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

The invention claimed is:

1. A computer-implemented method for prioritizing event processing based on system workload at a given time, the computer-implemented method comprising:
    analyzing a set of events being processed in an event processing system to determine whether any of a set of predetermined patterns exists;
    responsive to a determination that at least one of the set of predetermined patterns exists in the set of events, determining a processing priority associated with a respective event in the set of events;
    determining, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters;
    responsive to a determination that the event processing system is not at one of the acceptable predefined levels of stress, determining whether processing of the respective event can be delayed using the processing priority associated with the respective event and a time constraint attribute in an event rule in which the respective event is used, wherein the event rule uses one or more events;
    responsive to a determination that the respective event can be delayed, calculating a maximum delay for the respective event using the time constraint attribute of the event rule in which the respective event is used, when the respective event is a non-urgent event;
    storing the respective event with a time delay in event storage for later processing; and
    responsive to a determination that the respective event cannot be delayed, using the processing priority associated with the respective event and a time constraint attribute in an event rule in which the respective event is used, processing the respective event immediately.

2. The computer-implemented method of claim 1 wherein the determining, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters is performed by a stress-determining component of the event processing system, and wherein the stress-determining component further including a flag-setting component to set the stress flag showing that the event processing system is not at one of the acceptable predefined levels of stress according to the set of predefined parameters, and wherein the flag-setting component also removes the stress flag when a stress level of the event processing system returns one of the acceptable predefined levels of stress according to the set of predefined parameters.

3. The computer-implemented method of claim 1 wherein the analyzing a set of events being processed in an event processing system to determine whether any of a set of predetermined patterns exists is performed by a runtime component including an event receiver component.

4. The computer-implemented method of claim 3 wherein responsive to a determination that the event processing system is not at one of the acceptable predefined levels of stress, sending the respective event to a stress-processing component that processes events according the time constraint attribute in the event rule in which the respective event is used, and wherein the event rule uses one or more events.

5. The computer-implemented method of claim 1 wherein calculating the maximum delay for the respective event using the time constraint attribute of the event rule in which the respective event is used, when the respective event is a non-urgent event based on the time constraints in the rules the respective event relates to identified by a event rule-checking component, calculates the maximum delay using a selected one of predetermined time calculating methods including when the time constraint is defined as "must be processed within one hour", setting the maximum delay to just one hour from a current time; when the time constraint is defined as "same day," calculating a first time remaining between the current time and midnight, and setting the maximum delay to the first time remaining; and when the time constraint is defined as "specific time of day," calculating a second time remaining between the current time and the specific time of day, and setting the maximum delay to the second time remaining.

6. The computer-implemented method of claim 1 further comprising:
    in response to an event-storing component storing the respective event with a time delay in event storage for later processing, setting a timer component with the maximum delay of a stored event to enable an event retriever component to retrieve the respective event at an end of the maximum delay;

determining whether a timer task has expired for the respective event in event storage;
in response to a determination that the timer task has expired, reading the respective event from the event storage; and
processing the respective event in priority over events arriving newly in the event processing system.

7. The computer-implemented method of claim 1 further comprising:
responsive to a determination that the event processing system is at one of the acceptable predefined levels of stress, retrieving a stored event from the event storage using a stored event retriever component; and
sending a retrieved event to a normal processing component for processing, wherein the processing is in an order of time of time delay of stored events.

8. A data processing system for prioritizing event processing based on system workload, the data processing system comprising:
a processor;
a system memory, in communication with the processor, and having instructions stored thereon for execution by the processor, wherein the processor executes the instructions to direct the system to:
analyze a set of events being processed in an event processing system to determine whether any of a set of predetermined patterns exists;
responsive to a determination that at least one of the set of predetermined patterns exists in the set of events, determine a processing priority associated with a respective event in the set of events;
determine, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters;
responsive to a determination that the event processing system is not at one of the acceptable predefined levels of stress, determine whether processing of the respective event can be delayed using the processing priority associated with the respective event and a time constraint attribute in an event rule in which the respective event is used, wherein the event rule uses one or more events;
responsive to a determination that the respective event can be delayed, calculate a maximum delay for the respective event using the time constraint attribute of the event rule in which the respective event is used, when the respective event is a non-urgent event;
store the respective event with a time delay in event storage for later processing; and
responsive to a determination that the respective event cannot be delayed, using the processing priority associated with the respective event and a time constraint attribute in an event rule in which the respective event is used, process the respective event immediately.

9. The data processing system of claim 8 wherein the processor executes the instructions to direct the system to determine, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters further directs the system to use the instructions of a stress-determining component of the event processing system, and wherein the stress-determining component further including instructions of a flag-setting component to set the stress flag showing that the event processing system is not at one of the acceptable predefined levels of stress according to the set of predefined parameters, and wherein the flag-setting component also removes the stress flag when a stress level of the event processing system is at one of the acceptable predefined levels of stress according to the set of predefined parameters.

10. The data processing system of claim 8 wherein the processor executes the instructions to direct the system to analyze a set of events being processed in an event processing system to determine whether any of a set of predetermined patterns exists further directs a runtime component including an event receiver component.

11. The data processing system of claim 10 wherein the processor executes the instructions to direct the system responsive to a determination that the event processing system is not at one of the acceptable predefined levels of stress, to send the respective event to a stress-processing component that processes events according the time constraint attribute in the event rule in which the respective event is used, and wherein the event rule uses one or more events.

12. The data processing system of claim 8 wherein the processor executes the instructions to direct the system to calculate the maximum delay for the respective event using the time constraint attribute of the event rule in which the respective event is used, when the respective event is a non-urgent event based on the time constraints in the rules the respective event relates to identified by a event rule-checking component, further directs the system to calculate the maximum delay using a selected one of predetermined time calculating methods including when the time constraint is defined as "must be processed within one hour", setting the maximum delay to just one hour from a current time; when the time constraint is defined as "same day," calculating a first time remaining between the current time and midnight, and setting the maximum delay to the first time remaining; and when the time constraint is defined as "specific time of day," calculating a second time remaining between the current time and the specific time of day, and setting the maximum delay to the second time remaining.

13. The data processing system of claim 8 wherein the processor further executes the instructions to direct the system to:
in response to an event-storing component storing the respective event with a time delay in event storage for later processing, set a timer component with the maximum delay of a stored event to enable an event retriever component to retrieve the respective event at an end of the maximum delay;
determine whether a timer task has expired for the respective event in event storage;
in response to a determination that the timer task has expired, read the respective event from the event storage; and
process the respective event in priority over events arriving newly in the event processing system.

14. The data processing system of claim 8 wherein the processor further executes the instructions to direct the system to:
responsive to a determination that the event processing system is at one of the acceptable predefined levels of stress, retrieve a stored event from the event storage using a stored event retriever component; and send a retrieved event to a normal processing component for processing, wherein the processing is in an order of time of time delay of stored events.

15. A computer program product for prioritizing event processing based on system workload, the computer program product comprising a computer readable storage medium storing instructions for execution by a processor, the instructions comprising:

instructions for analyzing a set of events being processed in an event processing system to determine whether any of a set of predetermined patterns exists;

instructions responsive to a determination that at least one of the set of predetermined patterns exists in the set of events, for determining a processing priority associated with a respective event in the set of events;

instructions for determining, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters;

instructions responsive to a determination that the event processing system is not at one of the acceptable predefined levels of stress, for determining whether processing of the respective event can be delayed using the processing priority associated with the respective event and a time constraint attribute in an event rule in which the respective event is used, wherein the event rule uses one or more events;

instructions responsive to a determination that the respective event can be delayed, for calculating a maximum delay for the respective event using the time constraint attribute of the event rule in which the respective event is used, when the respective event is a non-urgent event;

instructions for storing the respective event with a time delay in event storage for later processing; and instructions for responsive to a determination that the respective event cannot be delayed, using the processing priority associated with the respective event and a time constraint attribute in an event rule in which the respective event is used, processing the respective event immediately.

16. The computer program product of claim 15, wherein the instructions for determining, by examining a setting of a stress flag in the event processing system, whether predetermined components and operation of the event processing system, including a central processing unit, a memory, an input queue, and a response time measuring component are not at one of acceptable predefined levels of stress according to a set of predefined parameters further comprise instructions for a stress-determining component of the event processing system, and wherein the instructions for stress-determining component further including instructions for a flag-setting component to set the stress flag showing that the event processing system is not at one of the acceptable predefined levels of stress according to the set of predefined parameters, and wherein the instructions for the flag-setting component also include instructions for removing the stress flag when a stress level of the event processing system is at one of the acceptable predefined levels of stress according to the set of predefined parameters.

17. The computer program product of claim 15, wherein the instructions for analyzing a set of events being processed in an event processing system to determine whether any of a set of predetermined patterns exists further comprise instructions for a runtime component including an event receiver component.

18. The computer program product of claim 15, wherein the instructions responsive to a determination that the event processing system is not at one of the acceptable predefined levels of stress, further comprise instructions for sending the respective event to a stress-processing component that processes events according the time constraint attribute in the event rule in which the respective event is used, and wherein the event rule uses one or more events.

19. The computer program product of claim 15, wherein the instructions for calculating the maximum delay for the respective event using the time constraint attribute of the event rule in which the respective event is used, when the respective event is a non-urgent event based on the time constraints in the rules the respective event relates to identified by a event rule-checking component, further comprise instructions for calculating the maximum delay using a selected one of predetermined time calculating methods including when the time constraint is defined as "must be processed within one hour", setting the maximum delay to just one hour from a current time; when the time constraint is defined as "same day," calculating a first time remaining between the current time and midnight, and setting the maximum delay to the first time remaining; and when the time constraint is defined as "specific time of day," calculating a second time remaining between the current time and the specific time of day, and setting the maximum delay to the second time remaining.

20. The computer program product of claim 15, further comprising:

instructions in response to an event-storing component storing the respective event with a time delay in event storage for later processing, for setting a timer component with the maximum delay of a stored event to enable an event retriever component to retrieve the respective event at an end of the maximum delay;

instructions for determining whether a timer task has expired for the respective event in event storage;

instructions for in response to a determination that the timer task has expired, for reading the respective event from the event storage; and instructions for processing the respective event in priority over events arriving newly in the event processing system.

* * * * *